Patented Jan. 16, 1923.

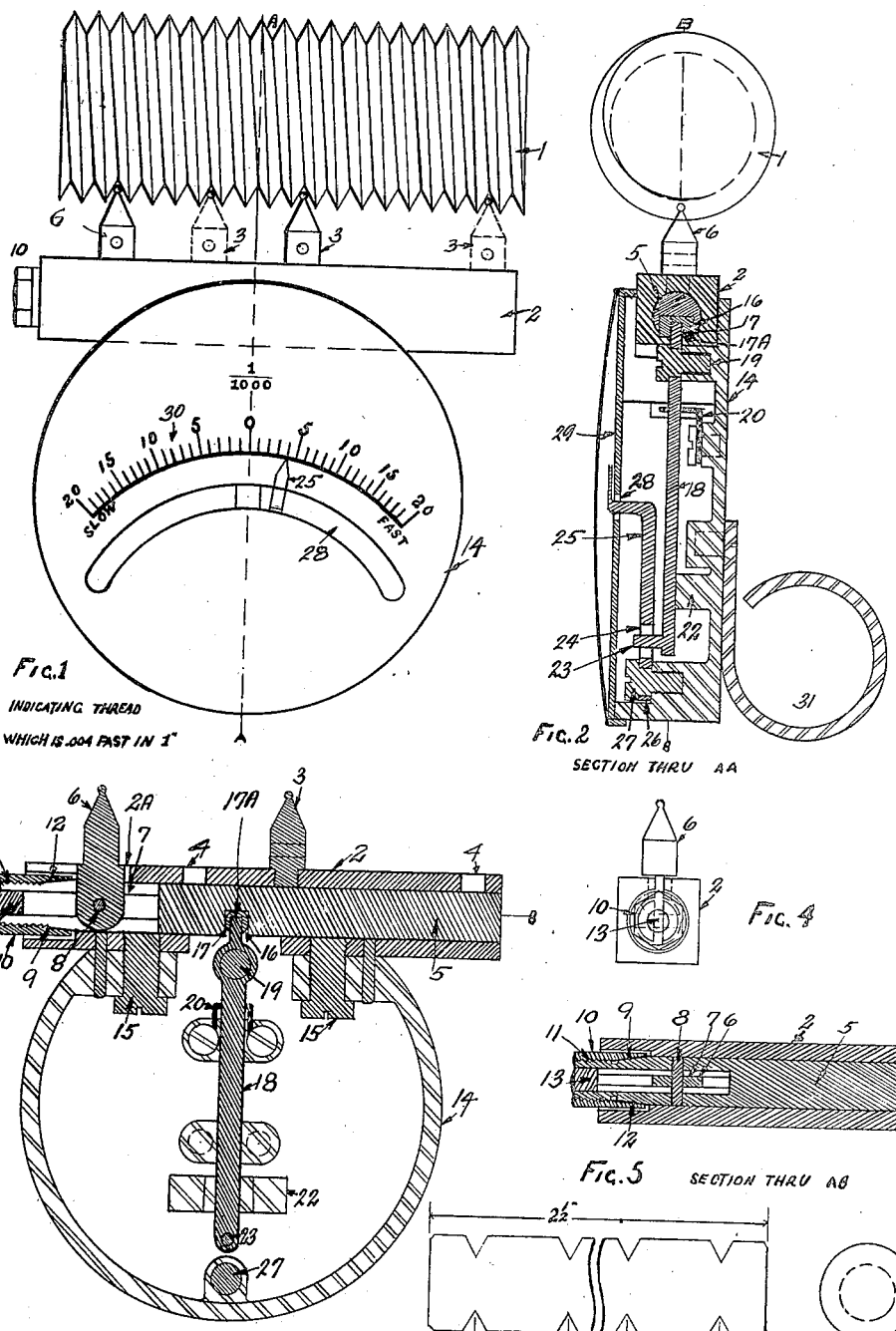

1,442,333

UNITED STATES PATENT OFFICE.

CLYDE J. GAUGH, OF WEST MILLCREEK, PENNSYLVANIA.

GAUGE.

Application filed January 5, 1920. Serial No. 349,470.

*To all whom it may concern:*

Be it known that I, CLYDE J. GAUGH, a citizen of the United States, residing in West Millcreek, in the county of Erie and State of Pennsylvania, have invented new and useful Improvements in Gauges, of which the following is a specification.

More particularly the invention is designed to gauge or determine error in the pitch of screw threads. Screw threads are usually designed with a pitch to give a certain number of threads per inch. Practically all standard threads as used can be gauged with pointers one inch apart. Some threads may be gauged with a smaller distance, as for instance, even-numbered threads. On the other hand it is preferable with some threads in order to emphasize the error to include greater distances than one inch, as for instance, two inches.

The invention is illustrated in the accompanying drawings as follows:—

Fig. 1 shows a front view of the device;

Fig. 2 a section on the line A—A in Fig. 1;

Fig. 3 a section on the line B—B in Fig. 2;

Fig. 4 an end elevation of the pointer holder;

Fig. 5 a section on the line A—B in Fig. 3;

Fig. 6 an enlarged view of a master gauge and

Fig. 7 an end view of such gauge.

1 marks a thread which is to be gauged.

The point holding sleeve 2 is preferably square in cross section. It is provided with a fixed point 3, this point being adapted to enter between two threads. The holder 2 has a plurality of openings 4 so that the point 3 may be changed for one-half inch spaces or for a two inch space.

A sliding bar 5 is mounted in the holder 2 and a movable point 6 is mounted in a slot 7 in this sliding bar. The pointer extends through a slot 2ᴬ in the holder 2. The mounting of the movable point is preferably made pivotal by means of a pin 8. The end of the bar 5 is tapered at 9 and a nut 10 is screwed onto the screw-threaded end 11 of the bar. The nut has a tapered surface 12 which engages the tapered surface 9.

By loosening the nut 10 the movable point 6 is loosened so that the points may be placed in the master gauge and accurately positioned by that gauge, the movable pointer swinging on its pivot to assist in this adjustment. By then screwing up the nut the point 6 may be locked in the adjusted position. A plug 13 is preferably arranged in an opening in the end of the bar 5 to prevent the outer end collapsing so that the point 6 may be more directly clamped with the wedge surfaces formed by the tapered surfaces 9 and 12.

A dial body 14 is secured to the holder 2 by means of screws 15. The sliding bar 5 is provided with a notch 16 in which is a bearing pin 17. A lever 18 has its end extending into a slot 17ᵃ in the pin 17. The lever 18 is journaled on a screw 19 secured in the body. Springs 20 are secured to the body by means of screws and hold the parts in their normal position. The lever operates over a guide plate 22 and is provided with a pin 23 which extends through a slot 24 in the dial pointer 25. The dial pointer has an opening 26 through which a screw 27 extends so as to journal the dial pointer. The dial pointer has an outward bend which carries it through a slot 28 in the face of the dial 29, the slot being concentric with the screw 27. The dial is graduated at 30 showing the pointer movement. The body is provided with a finger piece 31 by which the gauge may be more conveniently handled.

In operation the points 6 and 13 are thrust between threads as clearly shown in Fig. 1. If there is any error in these threads it results in a movement of the movable point 6 and with it a movement of the slide 5. This movement is communicated through the lever 18 to the pointer 25 and the pointer 25 indicates on the dial the error. It will be readily observed that the lever system increases the movement of the dial pointer 25 very much over the movement of the point 6 so that the slightest error is readily readable on the dial. It will be noted that the dial pointer is directly connected with the lever so that there is no chance for the disarrangement or displacement between the sliding bar and the pointer.

What I claim as new is:—

1. In a gauge, the combination of a sleeve-shaped point holder; a fixed pin mounted thereon; a sliding bar in the holder; a pin mounted on the bar and pivotally adjustable thereon; means for locking the pin in adjustment on the bar; a dial; a pointer operating on the dial; and devices transmitting the movement of the bar to the dial pointer, said devices increasing the movement of the dial pointer over that of the pin.

2. In a gauge, the combination of a point-holder in the form of a sleeve; a fixed pin on said holder; a sliding bar in the holder, said bar having a slot therein; a pin arranged in the slot and pivotally mounted relatively to the bar; means for locking the pin in adjustment in the slot; a dial; a dial pointer operating on the dial; and devices transmitting a movement of the bar to the pointer, said devices increasing the movement of the pointer over that of the pin.

3. In a gauge, the combination of a point-holder in the form of a sleeve; a fixed pin thereon; a sliding bar in the sleeve, said bar having a slot therein and a tapered end; a pin pivotally mounted in the slot; a nut arranged on the end of the bar and operating on the tapered end for contracting the slot to lock the movable pin in adjustment; a dial; a dial pointer operating on the dial; and devices transmitting a movement of the bar to the pointer, said devices increasing the movement of the dial pointer over that of the pin.

4. In a gauge, the combination of a point-holder in the form of a sleeve, said sleeve having a pin slot in one end thereof; a fixed pin on the holder; a sliding bar in the sleeve; a pin mounted on the bar and extending through the slot in the holder; means for locking the pin in adjustment relatively to the bar; a dial; a dial pointer operating on the dial; and devices transmitting a movement of the bar to the pointer, said devices increasing the movement of the dial pointer over that of the pin.

In testimony whereof I have hereunto set my hand.

CLYDE J. GAUGH.